United States Patent
Chow

(10) Patent No.: US 7,724,756 B2
(45) Date of Patent: May 25, 2010

(54) INPUT/OUTPUT BUFFER CONTROLLER FOR OPTIMIZED MEMORY UTILIZATION AND PREVENTION OF PACKET UNDER-RUN ERRORS

(75) Inventor: Joey Chow, Nepean (CA)

(73) Assignee: Alcatel-Lucent, Paris (FR)

( * ) Notice: Subject to any disclaimer, the term of this patent is extended or adjusted under 35 U.S.C. 154(b) by 202 days.

(21) Appl. No.: 12/000,151

(22) Filed: Dec. 10, 2007

(65) Prior Publication Data

US 2009/0147796 A1   Jun. 11, 2009

(51) Int. Cl.
*H04L 12/54* (2006.01)
*H04L 12/56* (2006.01)

(52) U.S. Cl. .................................. 370/412; 370/429
(58) Field of Classification Search ................. None
See application file for complete search history.

(56) References Cited

U.S. PATENT DOCUMENTS

| | | | |
|---|---|---|---|
| 7,420,919 B1 * | 9/2008 | Toudeh-Fallah et al. ..... | 370/235 |
| 7,539,143 B2 * | 5/2009 | Moores et al. ........... | 370/235.1 |
| 2003/0072317 A1 * | 4/2003 | Yuang et al. ................. | 370/412 |
| 2003/0126223 A1 * | 7/2003 | Jenne et al. .................. | 709/212 |
| 2004/0202169 A1 * | 10/2004 | Mukouyama et al. .... | 370/395.1 |
| 2007/0036168 A1 * | 2/2007 | Hsiao et al. ................. | 370/412 |
| 2007/0153683 A1 * | 7/2007 | McAlpine .................... | 370/229 |

* cited by examiner

*Primary Examiner*—Pankaj Kumar
*Assistant Examiner*—Marcus R Smith
(74) *Attorney, Agent, or Firm*—Kramer & Amado P.C.

(57) ABSTRACT

To avoid under-run conditions that result in corrupt packets at I/O interfaces, a FIFO buffer controller monitors key aspects of the contents of FIFO buffers of I/O interfaces. The FIFO buffer controller initiates transmission of data from the FIFO buffer when at least one complete packet is stored in the FIFO buffer or when the size of a partial packet stored therein is large enough so that the remainder of the packet would normally be received by the FIFO buffer before the stored part can be transmitted from the FIFO buffer; thereby avoiding an under-run error condition.

11 Claims, 7 Drawing Sheets

INPUT/OUTPUT BUFFER CONTROLLER FOR OPTIMIZED MEMORY UTILIZATION AND PREVENTION OF PACKET UNDER-RUN ERRORS

FIELD OF THE INVENTION

The invention is directed to communication networks, particularly to data packet interfaces of data packet communications systems.

BACKGROUND OF THE INVENTION

First-in first-out (FIFO) buffers, a form of shared memory, are often used at the ingress of input/output (I/O) interfaces of data packet communications systems to temporarily store data packets before they are transmitted from the I/O interface. However two problems can occur in such instances. The first problem occurs when the ingress data rate to the FIFO buffer, also referred to herein as the ingress FIFO data rate, is slower than the egress I/O interface data rate, also referred to herein as the egress I/O data rate. Since the ingress FIFO data rate is slower than the egress I/O data rate, pauses in transmission will occur if transmission of a data packet from the FIFO buffer is started before the entire data packet is received by the I/O interface. These pauses result in corruption of the transmitted data packet, their cause being referred to as under-run conditions. The second problem is that FIFO buffers are required for each I/O interface port, which can make data packet communications systems with a large number of I/O interface ports difficult and costly to build. This is because of the large amount of memory required to implement the FIFO buffers for a large number of I/O interface ports. Furthermore, if each FIFO buffer requires a large amount of memory, integrating the FIFO buffers into a field programmable gate array (FPGA) device, typically used in data packet communications systems, becomes costly and difficult due to the limited amounts of internal memory in such devices.

A known way to avoid the aforementioned problems is to ensure that ingress FIFO data rates are always greater than the egress I/O interface rates. However, this solution can impose a requirement for higher speed interfaces upstream, such as across a midplane or backplane of the data packet communication system, thereby increasing complexity, cost, power consumption, and reducing system reliability.

Another known way to avoid the aforementioned problems is to employ FIFO buffers that store entire packets prior to transmission in an effort to eliminate under-run conditions and packet corruption. However, these FIFO buffers require enough memory to store entire packets which at times could be quite large. The unfortunate result of this large memory requirement is that it puts practical limits on the number of I/O interface ports that can be supported, or it can make integrating a design into an FPGA device difficult unless external memory devices are used, which increases manufacturing costs of the data packet communications system.

Accordingly, there is a need for a technique of buffering data packets at the ingress of an I/O interface that does not require a large amount of memory per I/O interface port and that can reduce the occurrence of under-run errors.

SUMMARY OF THE INVENTION

It is an object of the invention to provide improved buffering of data packets for an I/O interface of a data packet communications system.

According to an aspect of the invention there is provided a data packet I/O buffer for an I/O interface of a data packet communications system. The I/O buffer includes a first-in first-out (FIFO) buffer for storing data packets; and a FIFO buffer controller that is operable to monitor contents of the FIFO buffer and, responsive to an end-of-packet indication being stored in the FIFO buffer or a current fill level of the FIFO buffer exceeding a threshold, initiating transmission of a whole or partial data packet stored in the FIFO buffer.

Preferably the FIFO buffer includes a plurality of logical FIFO buffers, one or more of which are for storing data packets having different characteristics than data packets stored in other of the logical FIFO buffers. The FIFO buffer controller is operable to monitor contents of the logical FIFO buffers, and responsive to an end-of-packet indication being stored in one of the logical FIFO buffers or a current fill level of that logical FIFO buffer exceeding a threshold, initiating transmission of a whole or partial data packet stored in that logical FIFO buffer. The characteristics of data packets may include one or more of destination port, destination channel, traffic priority, ingress FIFO data rate, egress IO data rate, typical packet length, associated customer, and associated network. Where a logical FIFO buffer has such a threshold, the threshold would be dependent upon a rate at which data packets are ingressing the logical FIFO buffer and a rate at which data packets are egressing the logical FIFO buffer.

According to another aspect of the invention there is provided a method of transmitting data packets from a data packet I/O buffer of a data packet communications system. The method includes the steps of: detecting a data packet ingressing the data packet IO buffer; determining if the ingressing data packet has caused a transmission condition to be met; and, responsive to the transmission condition having been met, initiating transmission of the ingressing data packet.

Preferably the step of determining comprises determining whether ingress of the data packet has caused either an end of packet indication to be stored in the data packet IO buffer or a current fill level of the data packet IO buffer to exceed a threshold.

Advantageously, the data packet IO buffer may be operable to store ingressing data packets by type of data packet, which type is associated with one or more characteristics of the data packets, and in which case the transmission condition corresponds to the type of data packet. The characteristics associated with a type of data packet include destination port, destination channel, traffic priority, ingress FIFO data rate, egress IO data rate, typical packet length, associated customer, and associated network. A separate threshold could exist for a given type of data packets. In which case, such a threshold would be dependent upon a rate at which data packets of that type are ingressing the data packet IO buffer and a rate at which data packets of the same type are egressing the data packet IO buffer.

Some embodiments of the invention use a FIFO buffer controller and a minimally sized FIFO buffer to adapt an ingress FIFO data rate at the FIFO buffer, to an egress I/O data rate at an I/O interface. This helps prevent corruption of data packets transmitted from the I/O interface caused by pauses during transmission of a data packet, such as when the I/O interface runs out of data packet bits to transmit due to an ingress FIFO data rate that is slower than the egress I/O data rate. The FIFO buffer controller monitors the contents of the FIFO buffer and controls data transmission from the FIFO buffer to alleviate pauses during transmission of a data packet from the I/O interface. This enables a slower ingress FIFO data rate than egress I/O data rate to be tolerated, which can lead to savings in cost and complexity of a data packet communication system, while maintaining error free data flow at the I/O interface.

Some embodiments of the invention use a FIFO buffer controller that monitors key aspects of contents that have been stored in a FIFO buffer. These aspects include number of complete data packets and size of partial data packets stored in the FIFO buffer, and they are used to determine when data packets are to be read out of the FIFO buffer. The FIFO buffer controller not only causes transmission of a data packet from the FIFO buffer to be initiated as soon as a complete data packet is received, but can also cause transmission of a data packet from the FIFO buffer to be initiated as soon as an amount of the data packet stored in the FIFO buffer has reached a threshold. By initiating transmission of a data packet as soon as the threshold is reached, the FIFO buffer controller is anticipating arrival of the remainder of the data packet. By anticipating this arrival and starting early transmission of the data packet, a couple of problems are solved. First, by starting transmission before a complete data packet is received in the FIFO buffer, the memory requirements of the FIFO buffer can be reduced over what would otherwise be required. The threshold setting in the FIFO buffer controller is configurable and is a function of the egress I/O data rate and the ingress FIFO data rate. This allows the FIFO buffer controller to adapt to various ingress FIFO data rates and egress I/O data rates. By properly setting this threshold, the amount of memory required by the FIFO buffer can be reduced since less data is stored before the packet is transmitted. Secondly, by waiting until the FIFO buffer fills to the threshold before initiating transmission of the data packet, the likelihood of a pause in the middle of transmission is eliminated compared to starting transmission as soon as the FIFO buffer receives a first bit or two of the data packet. The effect is to move any pause that would occur during transmission of a data packet to the beginning of the transmission of the data packet where the pause is not considered to be an error.

BRIEF DESCRIPTION OF THE DRAWINGS

The invention will be further understood from the following detailed description with reference to the drawings, in which.

DETAILED DESCRIPTION

Figure 1:
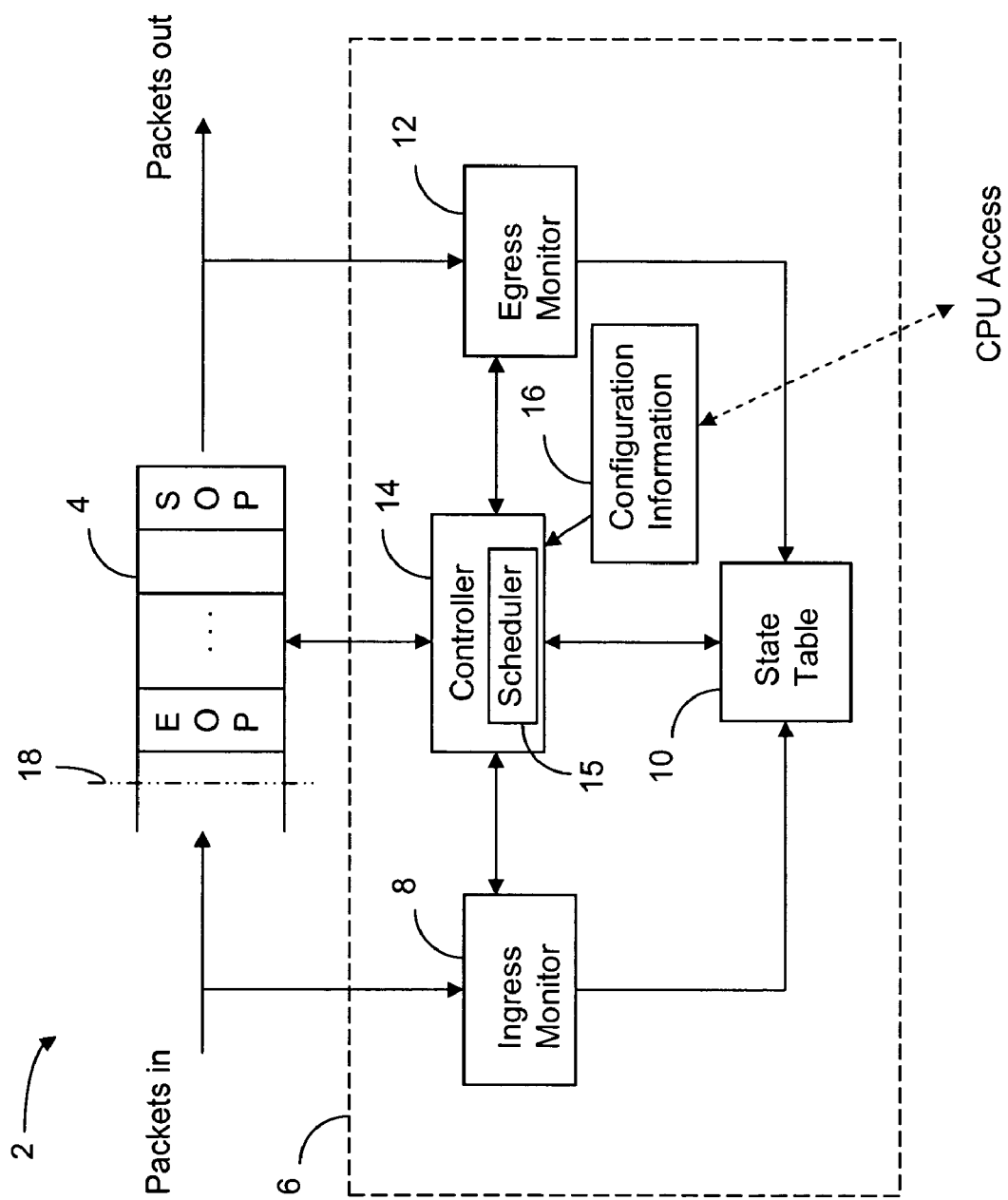
FIG. 1 is a high-level functional block diagram of an intelligent data packet I/O buffer according to a first embodiment of the invention.

Referring to FIG. 1, a first embodiment of an intelligent data packet I/O buffer 2 includes a FIFO buffer 4 and a FIFO buffer controller 6. The FIFO buffer 4 receives data packets at an ingress FIFO data rate N from upstream data packet processing equipment in a data packet communications system. The FIFO buffer 4 temporarily stores one or more of the data packets, and in some cases only a part of a data packet, before transmission of one or more of the data packets from the FIFO buffer 4 is initiated. Such transmission of data packets from the FIFO buffer 4 to an I/O interface of the data packet communication system occurs at an egress I/O data rate M, which is greater than the ingress FIFO data rate N. The FIFO buffer 4 is shown having a contents of a single data packet; the start of the data packet (SOP) being at the start, or first, position of the FIFO buffer 4 and the end of the data packet (EOP) being at a later position in the FIFO buffer 4. Since the EOP is at the last position in the FIFO buffer 4 containing any part of a data packet, the EOP defines a fill-level of the FIFO buffer 4. Hence the fill-level is the last position in the FIFO buffer 4 that is filled with data. The FIFO buffer controller 6 is coupled to the FIFO buffer 4 so as to allow the FIFO buffer controller 6 to monitor data packets ingressing and egressing the FIFO buffer 4, and to initiate transmission of a data packet.

The FIFO buffer controller 6 includes an ingress monitor 8 for monitoring data packets ingressing, that is, being received by, the FIFO buffer 4. The FIFO buffer controller 6 includes a state table 10 for storing dynamic FIFO status information. The ingress monitor 8 updates the dynamic FIFO status information in accordance with data packets that it monitors ingressing the FIFO buffer 4. For example, the ingress monitor 8 updates the state table 10 with the number of bytes ingressing the FIFO buffer 4 for a given data packet being received by the FIFO buffer 4 so that a current fill-level of the FIFO buffer 4 can be determined. The FIFO buffer controller 6 also includes an egress monitor 12 for monitoring data packets egressing, that is, being transmitted from, the FIFO buffer 4. The egress monitor 12 also updates the dynamic FIFO status information in accordance with data packets that it monitors egressing the FIFO buffer 4. For example, the egress monitor 12 updates the state table 10 with the number of bytes egressing the FIFO buffer 4 for a given data packet being transmitted from the FIFO buffer 4 so that a current fill-level of the FIFO buffer 4 can be determined.

The FIFO buffer controller 6 further includes a controller 14, which communicates with the ingress monitor 8, the egress monitor 12, the state table 10, and the FIFO buffer 4. The latter communication including initiating transmission of a data packet from the FIFO buffer 4. The FIFO buffer controller 6 also includes configuration information 16, for example pertaining to the data rates N, M and a threshold 18 with respect to the fill level of the FIFO buffer 4. The threshold it used in some cases for determining whether transmission of a data packet from the FIFO buffer 4 should be initiated. Generally, the configuration information 16 is static information with respect to the FIFO buffer 4; however this information is configurable, for example if information on the data rates N, M needs to be changed.

The controller 14 also includes a scheduler 15 for scheduling transmission of data packets from the FIFO buffer 4. In particular, whenever an EOP of a data packet is in the FIFO buffer 4 then the scheduler 15 schedules transmission of the data packet to which the EOP belongs. The controller 14 then initiates the transmission of the data packet from the FIFO buffer 4. Furthermore, if there is not an EOP in the FIFO buffer 4, but the configuration information 16 shows that the ingress FIFO data rate is less than the egress I/O data rate, then the scheduler 15 schedules transmission of whatever part of a data packet is in the FIFO buffer 4 as soon as the fill-level of the FIFO buffer 4 reaches the threshold 18. Whenever transmission of a data packet is initiated the entire data packet is transmitted from the FIFO buffer 4 before transmission of another data packet is started. That is, data packets are cleared from the FIFO buffer 4 one at a time.

Figure 2:
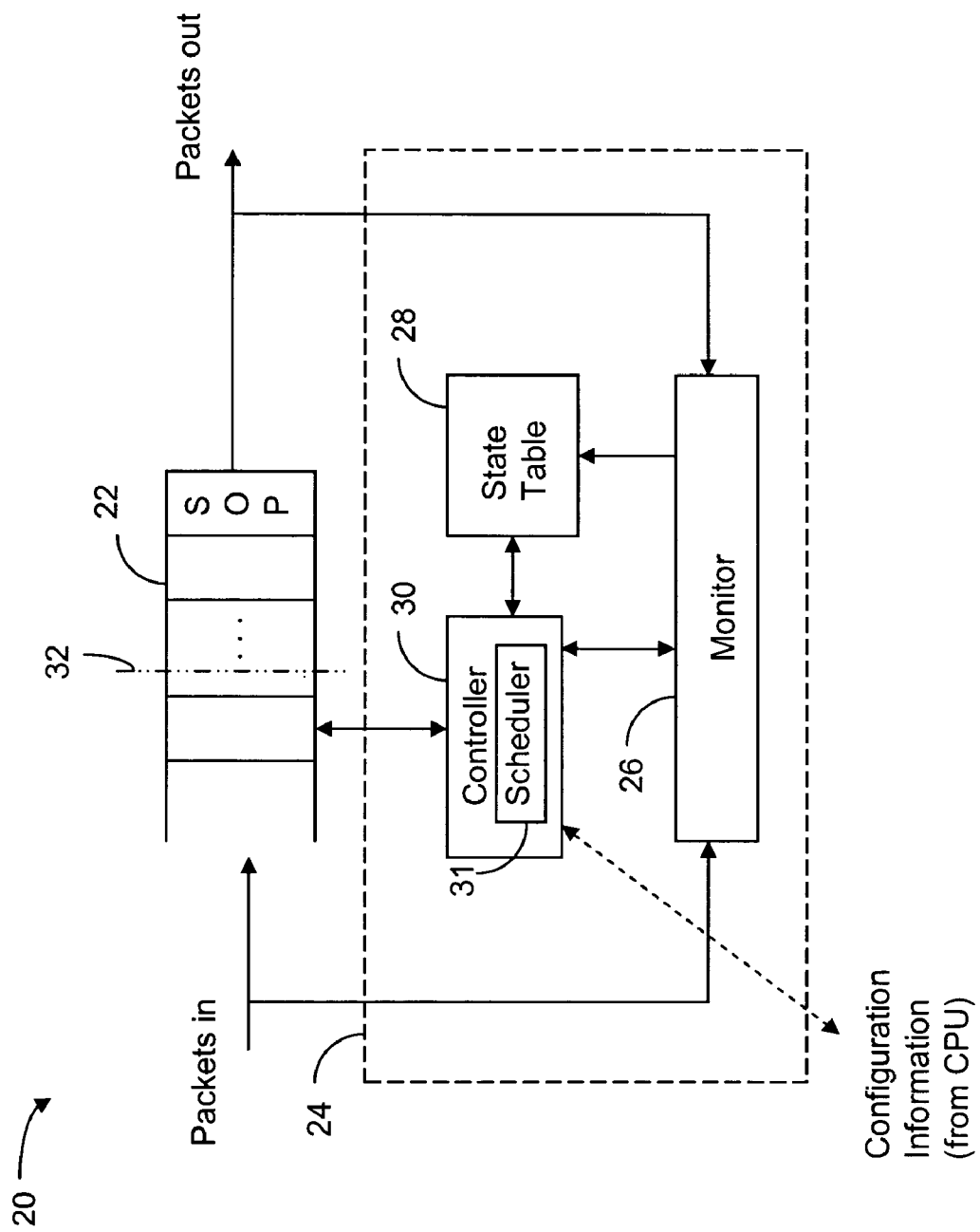
FIG. 2 is a high-level functional block diagram of an intelligent data packet I/O buffer according to second embodiment of the invention.

Referring to FIG. 2, a second embodiment of an intelligent data packet I/O buffer 20 includes a FIFO buffer 22 and a FIFO buffer controller 24. The differences between the first and second embodiments of the intelligent data packet I/O buffer 2, 20 are with regard to the FIFO buffer controller 24. That is, the FIFO buffer 22 has the same structure and operation as the FIFO buffer 4 in the first embodiment. The FIFO buffer controller 24 includes a monitor 26 for monitoring data packets ingressing and egressing the FIFO buffer 22. The monitor 26 replaces the ingress monitor 8 and egress monitor 12 of the first embodiment. The FIFO buffer controller 24 includes a state table 28 and a controller 30. The state table 28 stores dynamic FIFO status information with regard to the FIFO buffer 22 in the same manner as does the state table 10 of the first embodiment. The monitor 26 updates the state table 28 responsive to data packets ingressing and egressing the FIFO buffer 22; thereby keeping the dynamic FIFO status information stored in the state table 10, such as fill-level (e.g. number of bytes) of the FIFO buffer 22, up to date. The controller 30 can perform reads and writes to the state table 28, for example to read the fill-level of the FIFO buffer 22 or to write a threshold 32 value with respect to the fill-level. The controller 30 includes a scheduler 31, having the same form and function as the scheduler 15 in the first embodiment. That is, the scheduler 31 schedules the transmission of data packets from the FIFO buffer 22 according to the fill-level of the FIFO buffer 22 with respect to the threshold 32, and depending on the presence of an EOP in the FIFO buffer 22, as was explained earlier with respect to the scheduler 15 of the first embodiment.

Generally, the overall operation of the second embodiment of the intelligent data packet I/O buffer 20 is the same as that of the first embodiment, with the exception of the configuration information 16 which is not stored locally in the second embodiment but which is obtained from another part of the data packet communication system, e.g. a central processing unit (CPU) or central controller.

The depiction of the second embodiment shows a data packet being received by the FIFO buffer 22. The fill-level of the FIFO buffer 22 is just past the threshold 32. Hence the FIFO buffer controller 24 would have initiated transmission of the data packet from the FIFO buffer 22.

Figure 3:
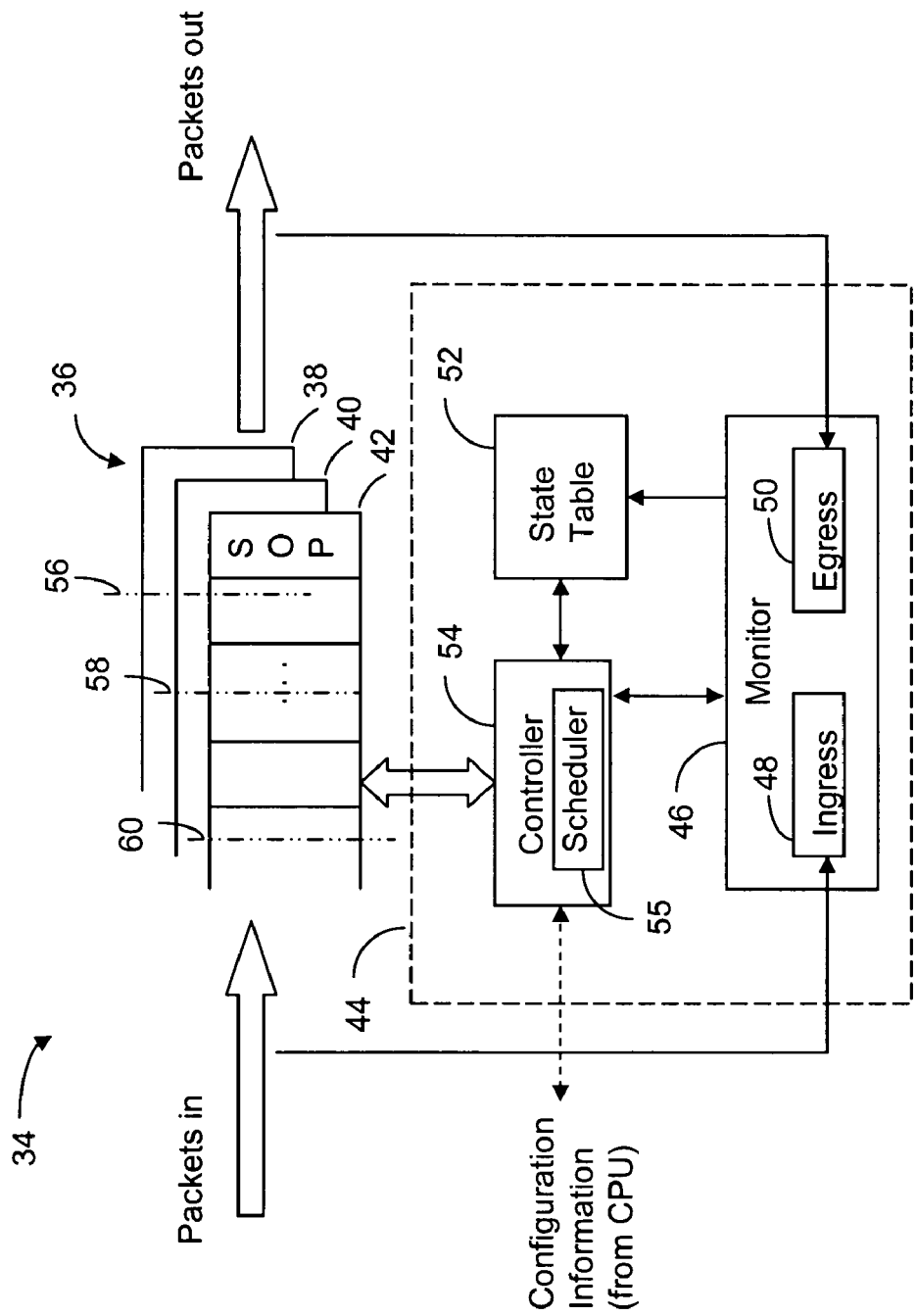
FIG. 3 is a high-level functional block diagram of an intelligent data packet I/O buffer according to third embodiment of the invention.

Referring to FIG. 3, a third embodiment of an intelligent data packet I/O buffer 34 includes a FIFO controller 44 and a FIFO buffer 36. The differences between the second and third embodiments of the intelligent data packet I/O buffer 20, 34 stem from the FIFO buffer 36. The FIFO buffer 36 is divided into three logical FIFO buffers 38, 40, and 42. The logical FIFO buffers 38, 40, and 42 each have a respective threshold 56, 58, 60 used for determining whether or not to initiate transmission of a data packet, or partial data packet, stored in therein. The logical FIFO buffers 38, 40, and 42 could be used for storing data packets of different types, for example data packets destined to different ports or channels, or of different priority, different ingress FIFO data rates, different typical lengths, or belonging to different customers or networks, or any combination thereof. In such cases any of the thresholds 56, 58, and 60, ingress FIFO data rate, and egress I/O data rate could be different among the logical FIFO buffers 38, 40, and 42.

The FIFO controller 44 generally has the same form and function as the FIFO controller 24 of the second embodiment. Differences between the FIFO controllers 24, 44 stem from an additional capability of the FIFO controller 44 to monitor and initiate transmission of data packets from each of the logical FIFO buffers 38, 40, and 42 independently. For this purpose, FIFO controller 44 accesses static configuration information, such as respective thresholds, ingress FIFO data rates, and egress I/O data rates of the logical FIFO buffers 38, 40, and 42, from a CPU or central controller of the data packet communication system. Additionally, the FIFO controller 44 maintains respective dynamic status information of the logical FIFO buffers 38, 40 and 42 in a state table 52.

The FIFO controller 44 includes a controller 54 having a scheduler 55, both of which correspond respectively to the controller 30 and scheduler 31 of the second embodiment. The scheduler 55 and controller 54 have additional respective capabilities of scheduling and initiating transmission of data packets from individual logical FIFO buffers 38, 40, and 42. The FIFO controller 44 also includes a monitor 46, which corresponds to the monitor 26 of the second embodiment. The monitor 46 includes an ingress monitoring function 48 and an egress monitoring function 50, for respectively monitoring data packets ingressing and egressing the logical FIFO buffers 38, 40, and 42 individually.

Figure 4:
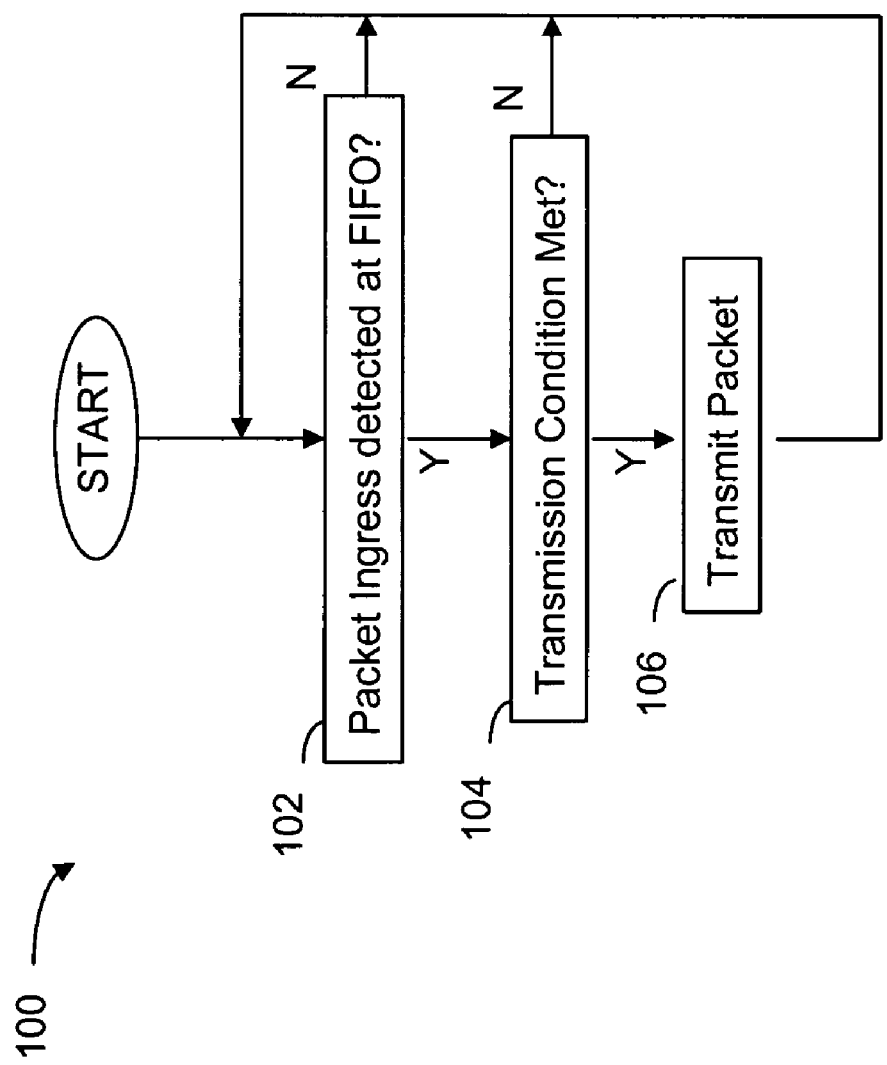
FIG. 4 is a flow chart depicting a method of transmitting data packets from an I/O buffer according to a fourth embodiment of the invention.

Referring to FIG. 4, a method 100 of transmitting a data packet from an I/O buffer according to a fourth embodiment of the invention is depicted. The method 100 will be described with respect to the third embodiment of the invention depicted in FIG. 3. The method 100 starts with a step 102 of determining whether or not ingress of a data packet data at the FIFO buffer 36 has been detected. In the negative case the method 100 returns to the beginning of this step 102, that is, the method loops back; thereby awaiting detection of data packet data ingressing the FIFO buffer 36. However, in the affirmative case, the method 100 proceeds to a step 104 of determining whether or not a condition for initiating transmission of the data packet data from the FIFO buffer 36 has been met. In the negative case, the method 100 returns to the beginning of the step 102 of awaiting detection of data packet data ingressing the FIFO buffer 36. However, in the affirmative case, the method 100 proceeds to a step 106 of transmitting the data packet data from the FIFO buffer 36 to an I/O interface of the data packet communication system. After the step 106 of transmitting the data packet data has been completed, the method 100 returns to the beginning of step 102 of awaiting detection of data packet data ingressing the FIFO buffer 36.

Figure 5:
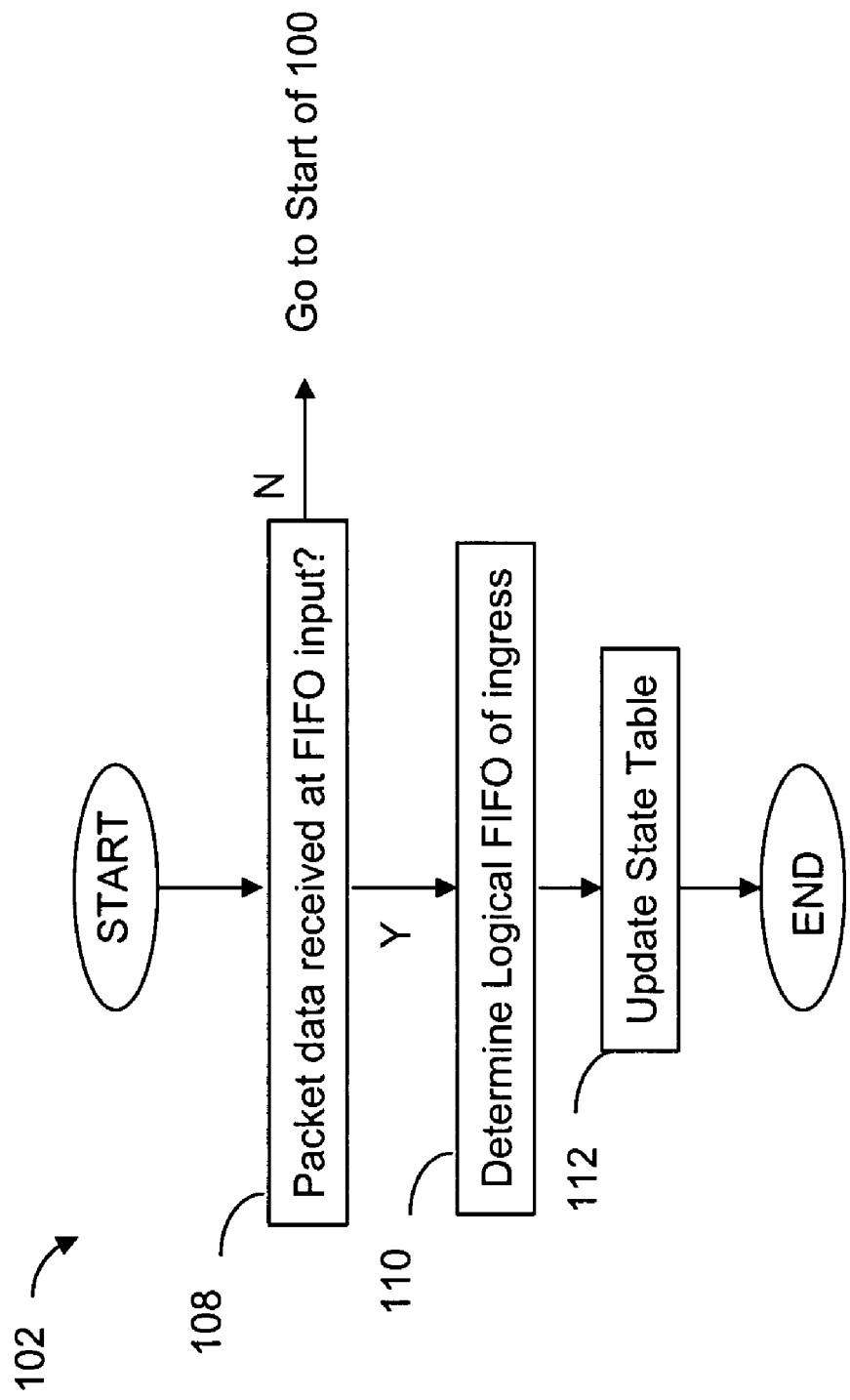
FIG. 5 is a flow chart illustrating in more detail a detection step of the method shown in FIG. 4.

Referring to FIG. 5, the step 102, shown in more detail, begins with a step 108 of determining whether or not data packet data has been received by the FIFO buffer 36. If no data has been received, the step 108 exits the step 102; thereby returning execution to the start of the method 100. However, if data has been received by the FIFO buffer 36, the step 102 proceeds to a step 110 of determining by which logical FIFO buffer 38, 40, or 42 the data was received. The step 102 then proceeds to a step 112 of updating the state table 52. In step 112, an entry corresponding to the logical FIFO buffer 38, 40, or 42 that received the data is updated in the state table 52. For example, if one byte of data was received in logical FIFO buffer 38, a corresponding entry in the state table 52 of a fill-level count in bytes for the logical FIFO buffer 38 would be incremented by one. The step 102 ends after completion of the step 112.

Figure 6:
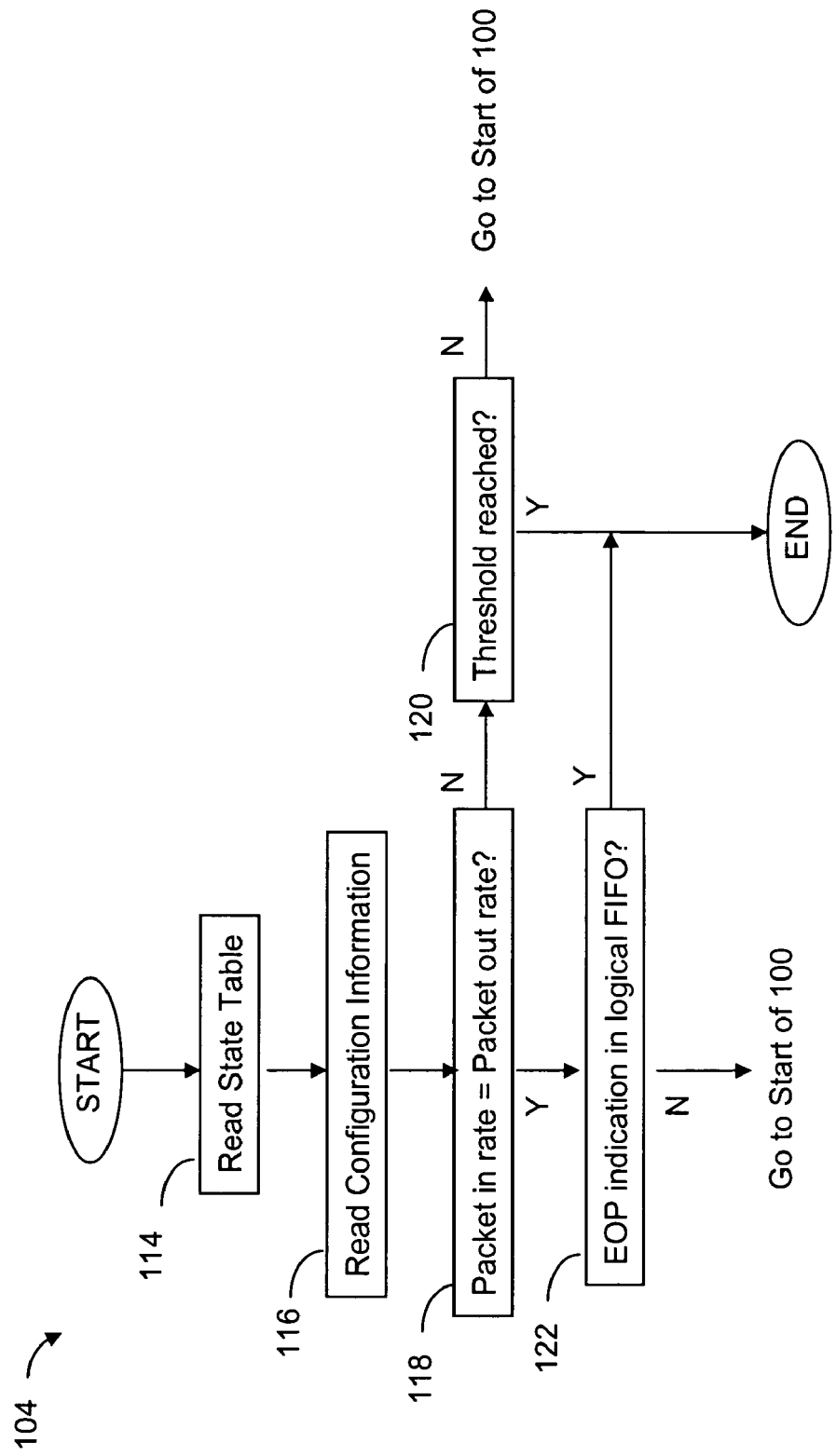
FIG. 6 is a flow chart illustrating in more detail a conditional step of the method shown in FIG. 4.

Referring to FIG. 6, the step 104, shown in more detail, begins with a step 114 of reading an entry of the state table 52 corresponding to a logical FIFO buffer 38, 40, or 42 that received data of a data packet. For example, the entry would indicate the current fill-level of that logical FIFO buffer 38, 40, or 42. This step 114 proceeds to a step 116 of reading an entry from the configuration information indicating a threshold, an ingress FIFO data rate and an egress I/O data rate associated with that logical FIFO buffer 38, 40, or 42. This step 116 proceeds to a step 118 of determining whether or not the ingress FIFO data rate is equal to the egress I/O data rate for that logical FIFO buffer 38, 40, or 42. If the ingress FIFO data rate is not equal to the egress I/O data rate, this step 118 exits and execution of the step 104 continues with a step 120 of determining whether or not the current fill-level of the logical FIFO buffer 38, 40, or 42 that received data has reached its respective threshold 56, 58, or 60. If the threshold 56, 58, or 60 has been reached the step 104 ends and the method 100 continues at the step 106 of transmitting data; otherwise if the threshold 56, 58, or 60 has not been reached the step 104 exits and execution returns to the start of the method 100. Returning to the step 118, if the ingress FIFO data rate is equal to the egress I/O data rate, execution of the step 104 proceeds to a step 122 of determining whether or not an EOP indication has been received in the logical FIFO buffer 38, 40, or 42 that received data. If an EOP indication has been received in that logical FIFO buffer 38, 40, or 42, step 104 ends and execution of the method 100 continues at the step 106 of transmitting data. Otherwise, if an EOP indication has not been received in that logical FIFO buffer 38, 40, or 42, the step 104 exits and execution returns to the start of the method 100, i.e. step 102 of awaiting data to be received by the FIFO buffer 36.

It should be noted that some embodiments could include an additional step similar to step 122 of checking for an EOP indication in the logical FIFO buffer 38, 40, or 42 after a negative result of step 120 of checking if the threshold has been reached. In that case if an EOP indication was in the logical FIFO buffer 38, 40, or 42 then the method would proceed to the step 106 of transmitting data, otherwise execution would return to the start of the method 100.

Figure 7:
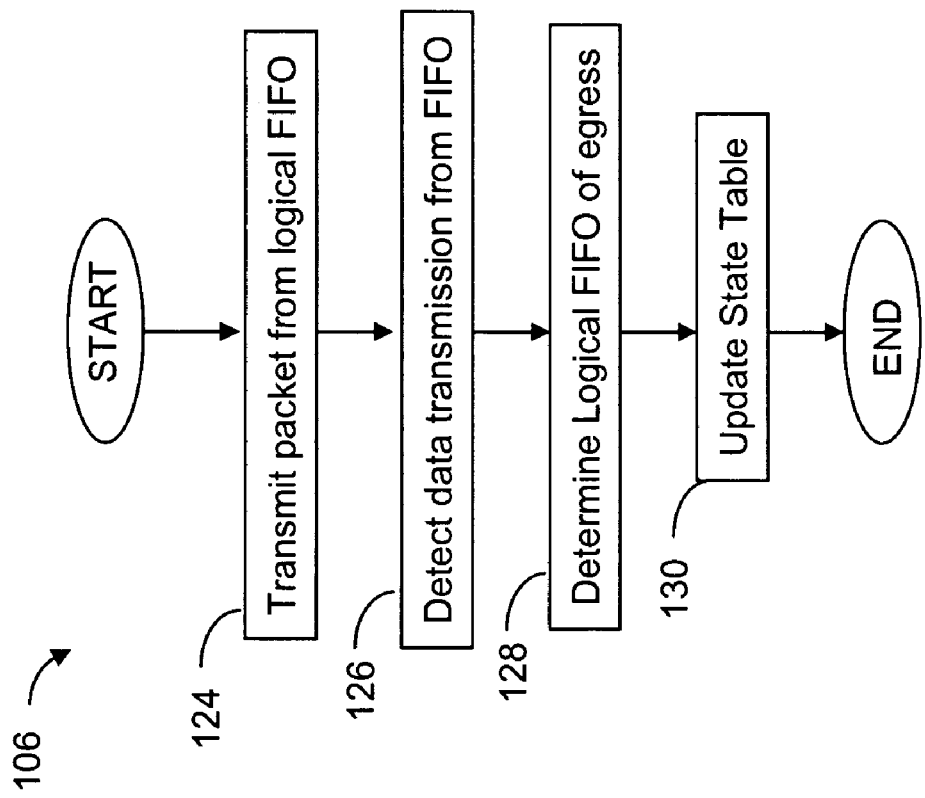
FIG. 7 is a flow chart illustrating in more detail a transmission step of the method shown in FIG. 4.

Referring to FIG. 7, the step 106, shown in more detail, begins with a step 124 of transmitting data from the logical FIFO buffer 38, 40, or 42. That step is followed by a step 126 of detecting the transmitted data, then a step 128 of determining from which logical FIFO buffer 38, 40, 42 the data was transmitted, and finally a step 130 of updating an entry in the state table 52 corresponding to that logical FIFO buffer 38, 40, or 42.

The method 100 of transmitting a data packet from an I/O buffer can be performed by the FIFO controller 44 and the FIFO buffer 36. The method 100 could also be performed by a CPU and the FIFO buffer 36, where the CPU has, or has access to, a memory or other storage means containing a software program embodying the method 100 and other stored information such as in the state table 52 and the static configuration information. The method 100 could also be adapted to exclude the use of logical FIFO buffers 38, 40, 42, and instead use a single FIFO buffer 36 without any such logical partitioning. In this case the FIFO buffer controllers 6, 24 of the first and second embodiments could perform the adapted method in conjunction with corresponding FIFO buffers 4, 22. Alternatively, the adapted method could be performed by a CPU and the FIFO buffer 4 or 22, where the CPU has, or has access to, a memory or other storage means containing a software program embodying the adapted method and other stored information such as in the state table 10 or 28 and the static configuration information. Furthermore, some embodiments of the method 100 may omit certain steps and/or reorder steps. For example, the step 114 of reading the state table may not be performed if the updates to that table in step 112 are still available in the controller 54. Also, the step 122 of checking for an EOP indication could be performed before the step 118 of comparing the ingress FIFO data rate to egress I/O data rate.

The FIFO buffer controller 6, 24, or 44 is also operable to detect error conditions that could have been caused by corrupt data being written into the FIFO buffer 4, 22, or 36, respectively. Detection of these error conditions allow the FIFO buffer controller 6, 24, or 44 to recover gracefully.

An advantage of embodiments of the invention is that their use enables data packet communication systems to be built that are more reliable, less costly, and have faster I/O interface data rates. Furthermore, the embodiments enable the use of FIFO buffers with minimal memory capacity, which allows for greater design flexibility. For example, using such FIFO buffers could allow for support of a higher number of I/O interface ports while using fewer devices and with greater integration of features into an FPGA.

Further advantages are that since the FIFO buffer controller monitors contents of the FIFO buffer to control transmission of data packets from the FIFO buffer, ingress FIFO data rates can be less than egress I/O interface data rates. That means the ingress FIFO data rate may be determined by items such as, but not limited to, a midplane interface (i.e. Serializer-Deserializer [SERDES] interface) or a network processor interface of the data packet communication system. Slower data rates are usually easier to achieve than higher data rates. Using slower data rates can also be more cost effective, result in less consumed power, and offer larger design margins. These can result in lower system cost, improved reliability, and opportunities for shorter time to market.

An advantage of smaller sized FIFO buffers is that fewer memory elements are required to implement a design incorporating the FIFO buffers or greater device integration is achievable, both of which directly leads to lower system cost and increased design simplification.

While the invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. A data packet input/output (I/O) buffer for a data packet communications system, comprising:
    a first-in first-out (FIFO) buffer for storing data packets; and
    a FIFO buffer controller, the FIFO buffer controller comprising:
        an ingress monitor and an egress monitor that monitor contents of the FIFO buffer;
        a state table updated by the ingress monitor with a number of bytes received by the FIFO buffer and updated by the egress monitor with a number of bytes transmitted by the FIFO buffer; and
        a scheduler that responds to an end-of-packet indication being stored in the FIFO buffer by transmitting a data packet that corresponds to the end-of-packet indication and, in the absence of an end-of-packet indication transmits a partial data packet from the FIFO buffer when an ingress FIFO data rate is less than an egress I/O data rate and a current fill level of the FIFO buffer exceeds a threshold.

2. The data packet I/O buffer of claim 1, wherein:
    the FIFO buffer comprises a plurality of logical FIFO buffers, one or more of which are for storing data packets having different characteristics than data packets stored in other of the logical FIFO buffers; and the FIFO buffer controller is further operable to monitor contents of the logical FIFO buffers.

3. The data packet I/O buffer of claim 2, wherein the characteristics of data packets includes one or more of destination port, destination channel, traffic priority, ingress FIFO data rate, egress IO data rate, typical packet length, associated customer, and associated network.

4. The data packet I/O buffer of claim 1, wherein the threshold is dependent upon a rate at which data packets are ingressing the FIFO buffer and a rate at which data packets are egressing the FIFO buffer.

5. The data packet I/O buffer of claim 2, wherein a threshold that pertains to a given logical FIFO buffer is dependent upon a rate at which data packets are ingressing that logical FIFO buffer and a rate at which data packets are egressing that logical FIFO buffer.

6. A method of transmitting data packets from a data packet input/output (I/O) buffer of a data packet communications system, comprising:

detecting a data packet ingressing the data packet I/O buffer and updating a state table with an entry corresponding to the data packet I/O buffer;

reading the entry from the state table;

reading configuration information that indicates a threshold, an ingress data rate, and an egress data rate associated with the data packet I/O buffer;

determining whether the ingress data rate is equal to the egress data rate for the data packet I/O buffer;

when the ingress data rate is not equal to the egress data rate for the data packet I/O buffer, comparing a current fill-level of the data packet I/O buffer to the threshold and transmitting data if the threshold has been reached; and when the ingress data rate is equal to the egress data rate for the data packet I/O buffer, transmitting data when the data packet I/O buffer has received an end-of-packet indication.

7. The method of claim 6, wherein the threshold is dependent upon a rate at which data packets are ingressing the data packet I/O buffer and a rate at which data packets are egressing the data packet I/O buffer.

8. The method of claim 6, wherein the data packet I/O buffer stores ingressing data packets by type of data packet, wherein the type is associated with one or more characteristics of the data packets and wherein the transmission condition corresponds to the type of data packet.

9. The method of claim 8, wherein the current fill level corresponds to the given type.

10. The method of claim 9, wherein the threshold is dependent upon a rate at which data packets of the given type are ingressing the data packet I/O buffer and a rate at which data packets of the same type are egressing the data packet I/O buffer.

11. The method of claim 8, wherein the one or more characteristics associated with a type of data packet are selected from the group of: destination port, destination channel, traffic priority, ingress FIFO data rate, egress I/O data rate, typical packet length, associated customer, and associated network.

* * * * *